(12) United States Patent
Steen

(10) Patent No.: US 9,736,982 B2
(45) Date of Patent: Aug. 22, 2017

(54) GRAIN TANK WITH INCREASED STORAGE CAPACITY FOR AN AGRICULTURAL HARVESTER

(71) Applicant: CNH INDUSTRIAL AMERICA LLC, New Holland, PA (US)

(72) Inventor: Pieter M. I. Steen, Ypres (BE)

(73) Assignee: CNH Industrial America LLC, New Holland, PA (US)

( * ) Notice: Subject to any disclaimer, the term of this patent is extended or adjusted under 35 U.S.C. 154(b) by 82 days.

(21) Appl. No.: 14/811,148

(22) Filed: Jul. 28, 2015

(65) Prior Publication Data

US 2016/0021821 A1    Jan. 28, 2016

(30) Foreign Application Priority Data

Jul. 28, 2014 (BE) .................................. 2014/0583

(51) Int. Cl.
  *A01D 90/10* (2006.01)
  *A01D 41/12* (2006.01)
  *B65D 88/58* (2006.01)

(52) U.S. Cl.
  CPC .......... *A01D 41/1226* (2013.01); *B65D 88/58* (2013.01)

(58) Field of Classification Search
  CPC ............ A01D 41/1226; A01D 41/1208; B65D 88/005; B65D 88/123; B65D 88/126; B65D 88/12; B65D 88/125; A01F 12/60
  USPC .......................................................... 460/23
  See application file for complete search history.

(56) References Cited

U.S. PATENT DOCUMENTS

| | | | | |
|---|---|---|---|---|
| 4,106,649 A * | 8/1978 | Nelson | ...................... | B60P 1/42 414/293 |
| 4,466,549 A * | 8/1984 | Hanaway | ........... | A01D 41/1226 220/4.03 |
| 5,151,064 A * | 9/1992 | Damman | ........... | A01D 41/1226 460/119 |
| 6,074,298 A * | 6/2000 | Majkrzak | ........... | A01D 41/1226 460/119 |
| 6,206,779 B1 * | 3/2001 | Gerber | ................. | A01C 15/005 414/502 |
| 6,508,705 B1 * | 1/2003 | Van Overschelde | ...... | A01D 41/1226 296/15 |
| 7,101,280 B2 * | 9/2006 | Colpaert | ............ | A01D 41/1208 460/119 |
| 7,918,720 B2 * | 4/2011 | Mohr | ................. | A01D 41/1226 460/119 |
| 8,029,346 B2 * | 10/2011 | Sprau | ................. | A01D 41/1226 460/119 |

(Continued)

FOREIGN PATENT DOCUMENTS

DE    4209841 A1    9/1993
DE    4320565 A1    1/1995

(Continued)

*Primary Examiner* — Árpád Fábián-Kovács
(74) *Attorney, Agent, or Firm* — Patrick M. Sheldrake

(57) ABSTRACT

A grain tank for an agricultural harvester includes a floor, a plurality of upstanding walls, and an unloading conveyance. The floor has a plurality of side edges. Each wall has a lower edge positioned along a corresponding side edge of the floor. The unloading conveyance has an inlet in communication with an interior of the grain tank adjacent to the floor. At least one of the walls of the grain tank is movable relative to the floor between an expanded harvest position and a folded transport position.

19 Claims, 4 Drawing Sheets

(56) References Cited

U.S. PATENT DOCUMENTS

| | | | |
|---|---|---|---|
| 8,146,974 B2* | 4/2012 | Horst | A01D 41/1226 296/15 |
| 9,089,090 B2* | 7/2015 | Claes | A01D 41/1226 |
| 2003/0078085 A1* | 4/2003 | Gerber | A01D 41/1226 460/119 |
| 2003/0232634 A1 | 12/2003 | Johnson et al. | |
| 2004/0033823 A1* | 2/2004 | Stephens | B60J 7/102 460/119 |
| 2008/0261672 A1* | 10/2008 | Stukenholtz | A01D 41/1226 460/119 |
| 2008/0265601 A1 | 10/2008 | Mohr et al. | |
| 2009/0215509 A1* | 8/2009 | Johnson | A01D 41/1226 460/23 |
| 2009/0270149 A1 | 10/2009 | Sprau | |
| 2011/0095554 A1* | 4/2011 | Zeuner | A01D 41/1226 296/15 |
| 2013/0196724 A1* | 8/2013 | Barnes | A01D 41/1226 460/119 |
| 2013/0196725 A1* | 8/2013 | Bossuyt | A01D 41/1226 460/119 |
| 2013/0252681 A1* | 9/2013 | Cooksey | A01D 41/1226 460/119 |
| 2013/0296005 A1 | 11/2013 | Claes et al. | |
| 2015/0148112 A1* | 5/2015 | Ducroquet | A01D 41/1226 460/119 |
| 2015/0272000 A1* | 10/2015 | Claes | A01D 41/00 56/473.5 |
| 2016/0286723 A1* | 10/2016 | Banks, Jr. | A01D 41/1226 |
| 2016/0338269 A1* | 11/2016 | Steen | A01D 41/1226 |

FOREIGN PATENT DOCUMENTS

| | | |
|---|---|---|
| DE | 102007054277 A1 | 5/2009 |
| FR | 2075065 A5 | 10/1971 |
| GB | 2296175 A1 | 6/1996 |

\* cited by examiner

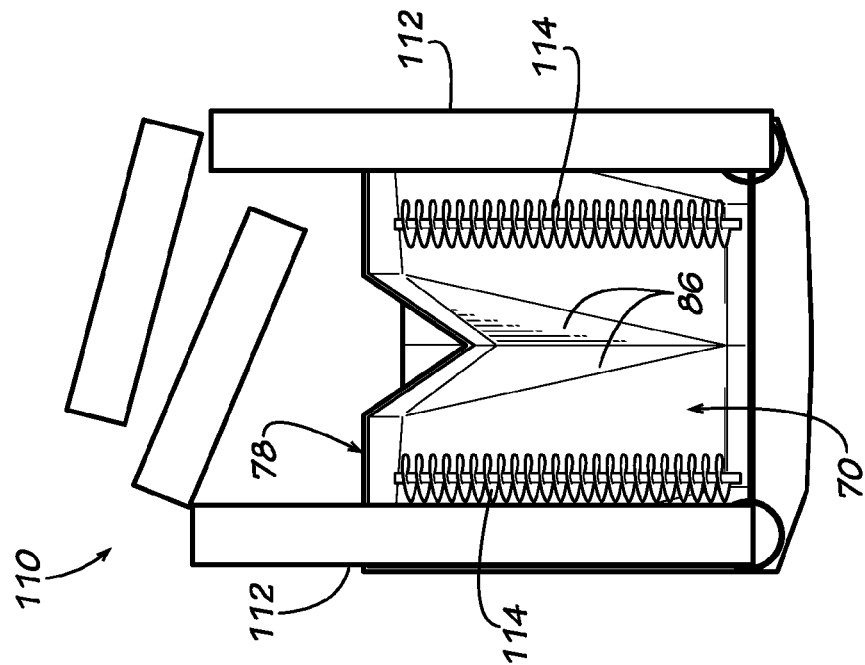
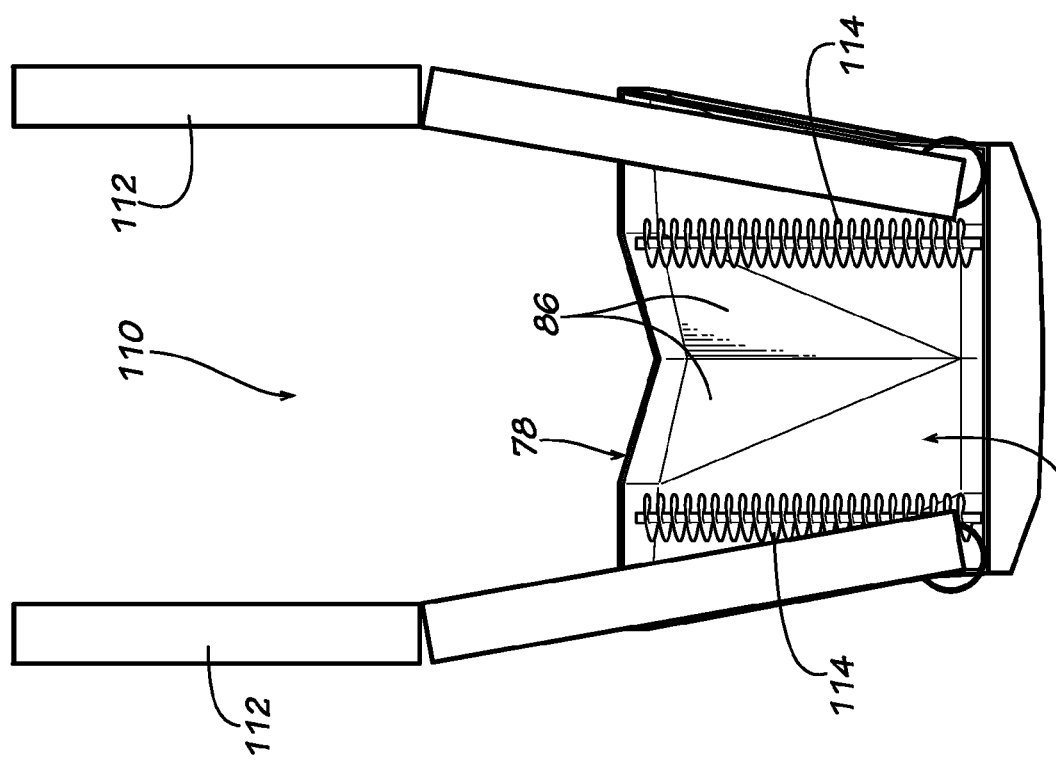

GRAIN TANK WITH INCREASED STORAGE CAPACITY FOR AN AGRICULTURAL HARVESTER

This application claims foreign priority under 35 U.S.C. §119 to Belgian Application BE2014/0583 filed Jul. 28, 2014 titled "GRAIN TANK WITH INCREASED STORAGE CAPACITY FOR AN AGRICULTURAL HARVESTER" and having Pieter M. I. Steen as the inventor. The full disclosure of BE2014/0583 is hereby incorporated herein by reference.

BACKGROUND OF THE INVENTION

This application claims foreign priority under 35 U.S.C. §119 to Belgian Application BE2014/0583 filed Jul. 28, 2014 titled "GRAIN TANK WITH INCREASED STORAGE CAPACITY FOR AN AGRICULTURAL HARVESTER" and having Pieter M. I. Steen as the inventor. The full disclosure of BE2014/0583 is hereby incorporated herein by reference.

The present invention relates to agricultural harvesters, and, more specifically to grain tanks used to temporarily store harvested grain within such harvesters.

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Grain tanks for combines are often fitted with powered covers and/or extensions at the top of the upstanding walls that may be electrically, hydraulically or pneumatically powered. Extensions allow the capacity of the grain tank to be increased during harvesting, while a cover prevents the harvested grain from spilling over as the tank becomes full and the combine encounters bumps, dips, sloped ground surfaces, etc. The extensions can be moved to the raised position for harvesting and to a lowered position for road transport. The cover can be moved to the covered position for harvesting and to the open position for unloading of the grain. While such covers and extensions are effective to increase the grain tank capacity to a limited extent, the overall percentage increase of the grain tank is not significant since the size and configuration of the grain tank itself remains static.

What is needed in the art is a grain tank with increased storage capacity during harvesting of grain.

SUMMARY OF THE INVENTION

The present invention provides a grain tank for an agricultural harvester with at least one upstanding wall which is movable between a harvest position and a transport position to provide the grain tank with increased storage capacity, while still meeting overall maximum dimension requirements when in the transport position.

The invention in one form is directed to a grain tank for an agricultural harvester, including a floor, a plurality of upstanding walls, and an unloading conveyance. The floor has a plurality of side edges. Each wall has a lower edge positioned along a corresponding side edge of the floor. The unloading conveyance has an inlet in communication with an interior of the grain tank adjacent to the floor. The grain tank is characterized in that at least one of the walls is movable relative to the floor between an expanded harvest position and a folded transport position.

An advantage of the present invention is that the overall storage capacity of the grain tank is considerably increased when in a harvest position.

Another advantage is that the overall size of the grain tank can be reduced when in a transport position to meet overall width requirements as the harvester travels on a road.

Yet another advantage is that the expanding and contracting grain tank can accommodate either a single or dual unloading auger(s).

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 6 is a top view of another embodiment of the grain tank of the present invention, having a dual unloading system with two unloading augers, with the grain tank and unloading augers in the harvest position; and FIG. 7 is a top view of the grain tank shown in FIG. 6, with the grain tank and unloading augers in the transport position.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
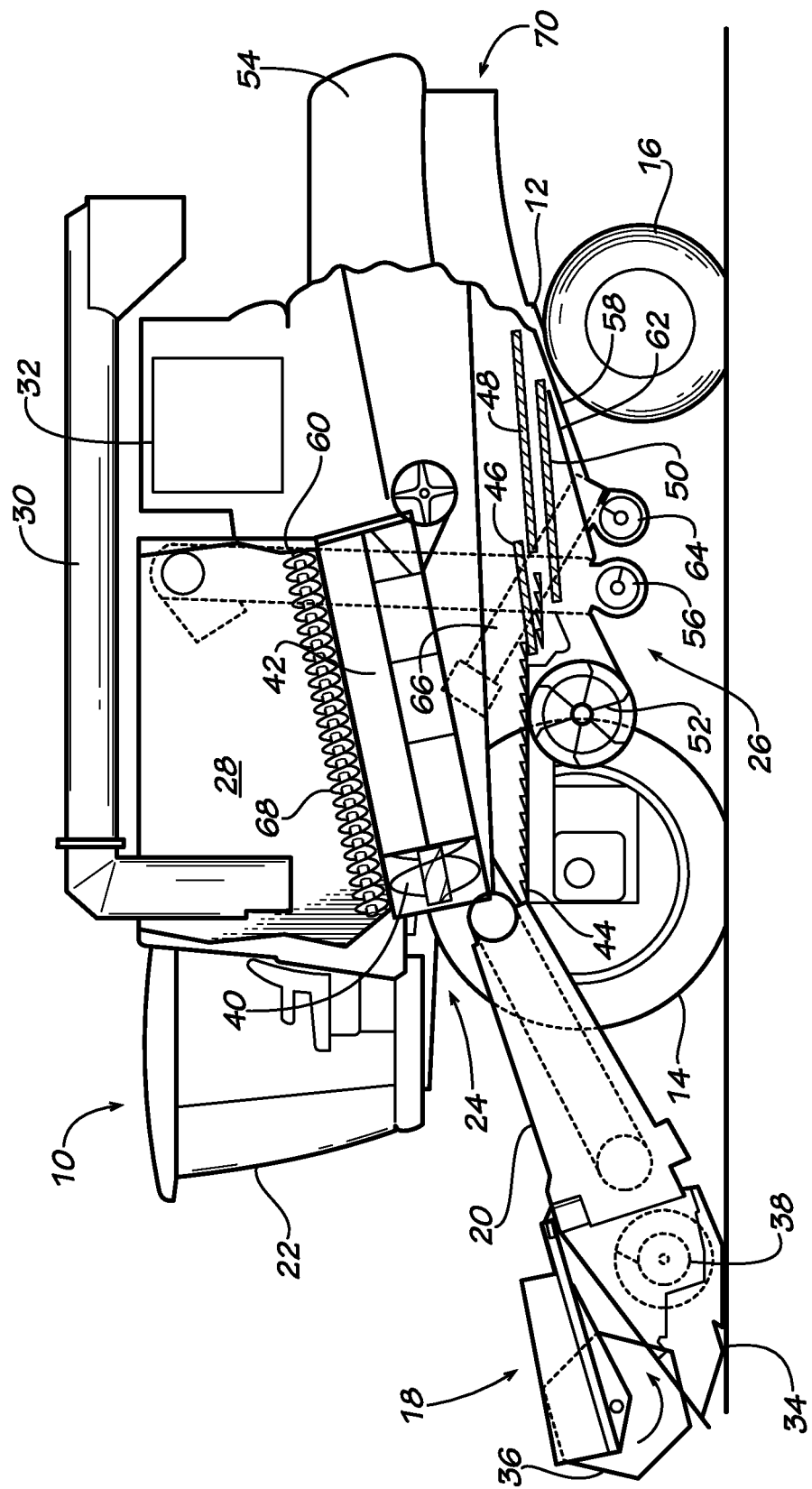
FIG. 1 is a side view of an embodiment of an agricultural harvester in the form of a combine which includes an embodiment of a grain tank of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

According to an aspect of the present invention, the grain tank 28 has one or more upstanding walls, and optionally also the floor, that expand and contract to provide an increased storage capacity when placed in a harvest position. With conventional grain tank designs, extensions may be provided at the top of the grain tank that provide a nominal increase in storage capacity, but the upstanding walls and floor of the grain tank remain static. Thus, the harvesting capacity of the main body of the grain tank remains the same, regardless of whether the combine is in a harvest mode or transport mode.

Figure 2:
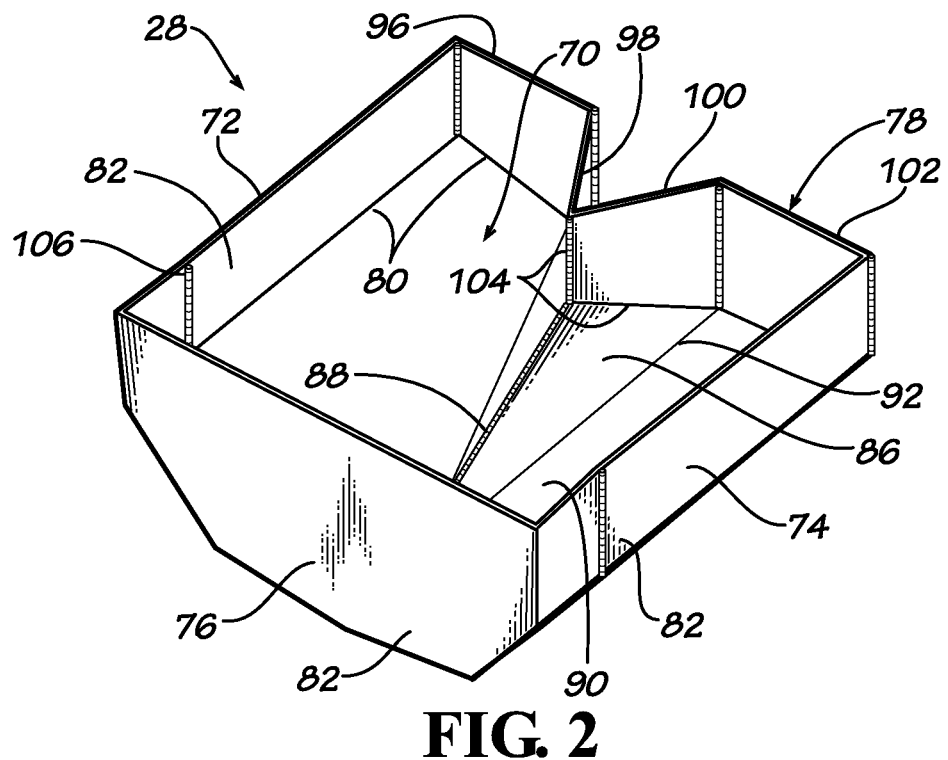
FIG. 2 is a perspective view of the grain tank shown in FIG. 1, with the walls in a transport position.
Figure 3:
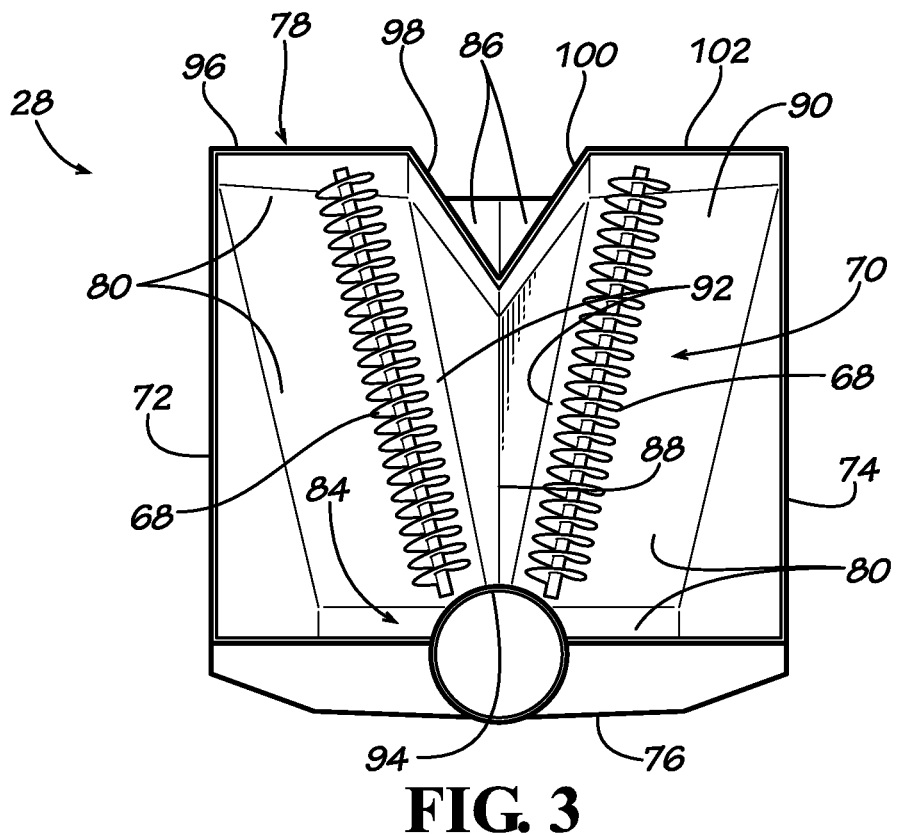
FIG. 3 is a top view of the grain tank shown in FIG. 2, also showing the cross augers in the bottom of the grain tank.
Figure 4:
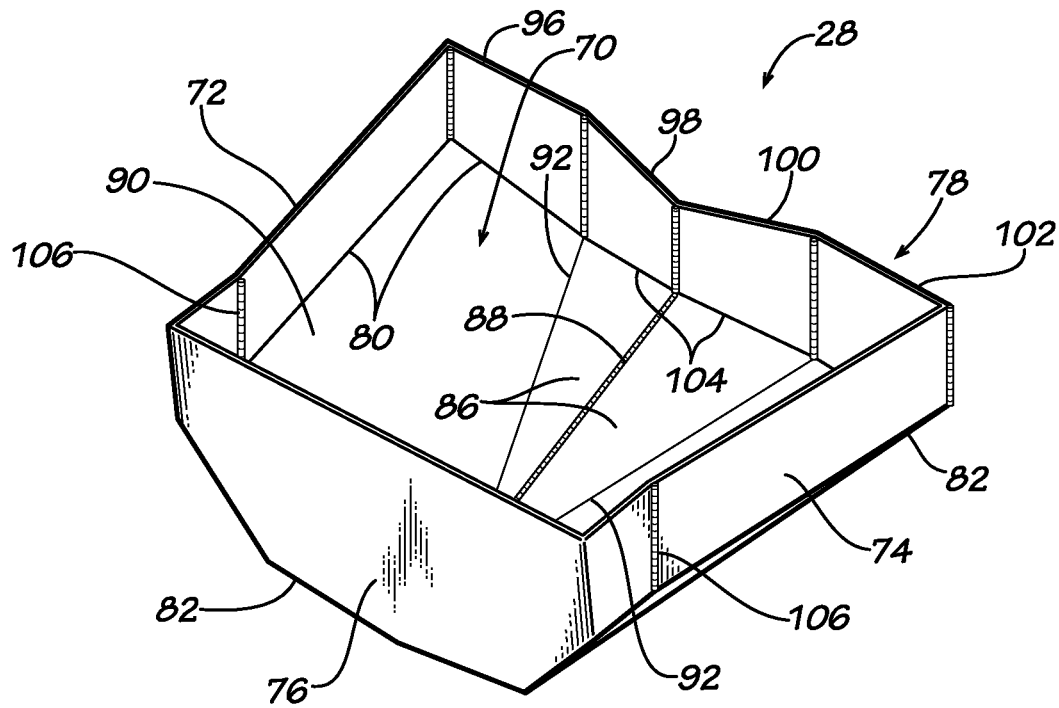
FIG. 4 is a perspective view of the grain tank shown in FIGS. 2 and 3, with the walls in a harvest position.

More particularly, and referring now to FIGS. 2-4, grain tank 28 includes a floor 70 and a plurality of upstanding walls including side walls 72 and 74, a front wall 76 and a rear wall 78. The floor 70 has a plurality of side edges 80, and each of the walls 72, 74, 76 and 78 have a lower edge 82 which is positioned along a corresponding side edge 80 of the floor 70. The unloading conveyance 30 has an inlet 84 which is positioned at the approximate center of front wall 76 (side to side) and in communication with an interior of the grain tank 28 adjacent to the floor 70.

One or more of the walls 72, 74, 76 and/or 78 are movable relative to the floor 70 between an expanded harvest position and a folded transport position, whereby the grain tank 28 has an increased storage capacity during harvesting. In the illustrated embodiment, the floor 70 and the rear wall 78 are expandable and contractible in an accordion manner to accommodate movement between the harvest position and the transport position. The floor 70 includes two abutting triangular shaped plates 86, with each of the triangular shaped plates 86 folding relative to each other along an abutment edge 88 using a hinge (not specifically illustrated). The hinge can be a piano type hinge, a number of smaller discrete hinges, or a living hinge such as a flexible material. The triangular shaped plates 86 fold up and down relative to a remaining portion 90 of the floor 70 along a respective lateral edge 92. The lateral edges 92 join at an apex 94 therebetween which is positioned adjacent to the front wall 76.

Figure 5:
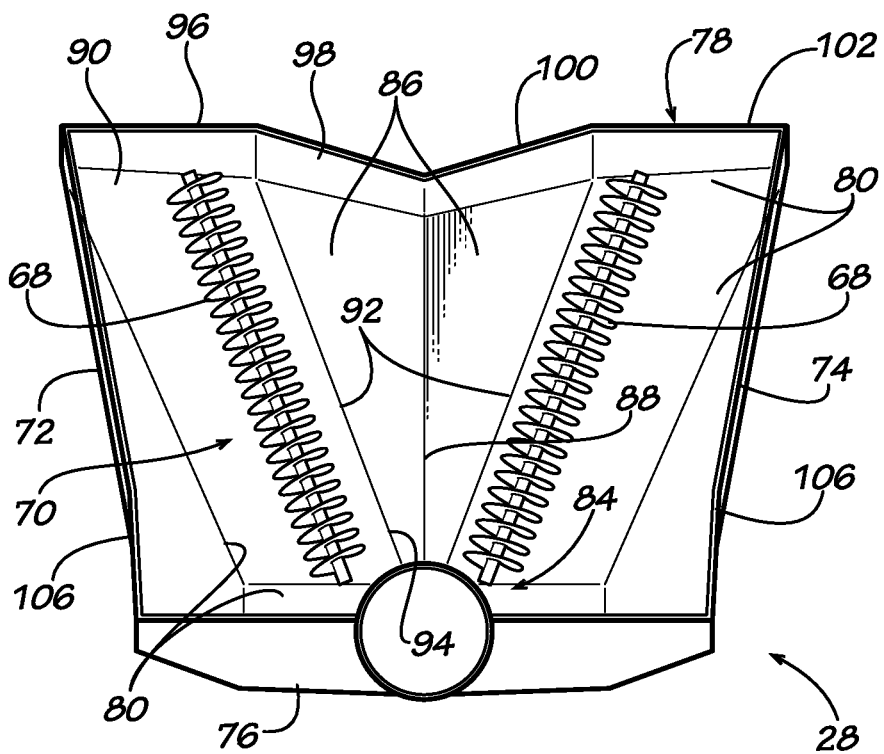
FIG. 5 is a top view of the grain tank shown in FIG. 4, also showing the cross augers in the bottom of the grain tank.

The rear wall 78 includes a number of wall segments which are hinged together to allow the accordion type movement when transitioning between the harvest position and the transport position. In the illustrated embodiment, the rear wall 78 has four wall segments 96, 98, 100 and 102 which are hinged together with generally vertical hinge axes. However, the number of wall segments and the orientation of the hinge axes between the wall segments can vary. The hinges can be any type of hinge such as a piano type hinge, a number of smaller discrete hinges, or a living hinge such as a flexible material. The middle two wall segments 98 and 100 each have a width which extends between a respective abutment edge 88 and lateral edge 92 when the floor 70 is in the harvest position (FIGS. 4 and 5). The middle wall segments 98 and 100 have a bottom edge 104 which is angled to match and lie closely adjacent to the respective triangular shaped plate 86 when the floor 70 is in the harvest position.

Each of the side walls 72 and 74 also are configured to expand and contract between a transport position (FIGS. 2 and 3) and a harvest position (FIGS. 4 and 5). In the illustrated embodiment, each side wall 72 and 74 includes a generally vertically arranged hinge 106 which allows the rearward portion of each side wall 72 and 74 to pivot inwards and outwards as the side walls 72 and 74 move between the transport position and harvest position. The type of hinges, number of hinges and orientation of the hinges can vary depending on the application.

A pair of cross augers 68 are provided within the grain tank 28 adjacent to the floor 70. The cross augers 68 are positioned on opposite lateral sides of the triangular shaped plates 86, and are generally parallel to a respective lateral edge 92. The cross augers 68 are configured for moving grain toward the inlet 84 of the unloading conveyance 30.

Prior to operation of the harvester 10 during a harvest mode, the grain tank 28 is transitioned from a transport mode to a harvest mode, whereby the floor 70, side walls 72 and 74, and rear wall 78 are all in a harvest position. Any suitable type of actuator may be used for moving the floor 70, side walls 72 and 74 and rear wall 78 between the transport position and harvest position, such as a hydraulic actuator, pneumatic actuator, mechanical actuator, etc. When moving between the transport and harvest position, the two triangular shaped plates 86 move downward and outward such that the rear end of the abutment edges 88 is lower, and the spacing between the rear ends of the lateral edges 92 is wider. Concurrently, the two middle wall segments 98 and 100 of the rear wall 78 fold rearwardly until the wall segments 96-102 define a substantially straight rear wall 78 (FIG. 5). The engine compartment for the IC engine 32 is positioned closely behind the grain tank 28, and thus the rear wall 78 cannot expand in a rearward direction beyond the size constraints of the grain tank 28 when in the harvest mode. Similarly, the operator cab 22 is positioned closely in front of the grain tank 28, and thus the front wall 76 cannot expand in a forward direction beyond the size constraints of the grain tank 28 when in the harvest mode.

Referring now to FIGS. 6 and 7, there is shown another embodiment of a grain tank 110 of the present invention. Grain tank 110 is similar to grain tank 28 shown in FIGS. 2-5 in that it includes a rear wall 78 and a floor 70 with a pair of triangular shaped plates 86 which expand and contract in an accordion manner when moving from a transport position (FIG. 7) to a harvest position (FIG. 6). Grain tank 110 primarily differs from grain tank 28 in that it includes a dual unloading system with a pair of unloading conveyances 112, each having an inlet in a respective front corner of the grain tank 110. A pair of cross augers 114 extending in a fore-to-aft manner on either side of the triangular shaped plates 86 are structured and arranged to convey grain to the inlet of each respective unloading conveyance 112. Each unloading conveyance 112 is shown as a folding type auger arrangement with the augers being folded for a transport mode (FIG. 7) and unfolded for a harvest mode (FIG. 6). However, the unloading conveyances 112 need not be foldable, depending on the application.

In the illustrated embodiment, the grain tank 28 has overall width when in the transport mode of 3.5 m or less, and an overall width when in the harvest mode of approximately 4 m or even more. Of course, these dimensions are only exemplary and can vary between applications depending on the needs and configuration of the combine 10.

Moreover, in the illustrated embodiment, the rear wall 78 is configured to expand and contract as the side walls 72, 74 moved from a transport position to a harvest position, or vice versa. It is also to be understood that the front wall 76 can be configured to expand and contract, or each of the front wall 76 and rear wall 78 can expand and contract, when moving between the transport position and harvest position, or vice versa.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A grain tank for an agricultural harvester, comprising:
an expandable and contractable floor comprising a hinged floor portions and a plurality of side edges;
a plurality of upstanding walls, each said wall having a lower edge positioned along a corresponding side edge of the floor, wherein at least one of the plurality of upstanding walls comprises a plurality of movable wall portions connected by a plurality of hinges configured for rotation about axes extending at least in a vertical direction, wherein the wall portions are movable over the floor between an expanded harvest position wherein the floor portion and a folded transport position in which the movable wall portions have been moved toward one another and the floor portions have been moved toward one another such that an exposed lateral surface area of the floor below the upstanding walls is less in the transport position than in the harvest position, wherein the hinges are configured such that the wall and floor portions are both expandable and contractable between the positions in a folding manner; and at least one unloading conveyance, each said unloading conveyance having an inlet in communication with an interior of the grain tank adjacent to the floor.

2. The grain tank of claim 1, wherein said walls include a pair of side walls, a front wall and a rear wall, and wherein the floor and the rear wall are expandable and contractable in an accordion manner.

3. The grain tank of claim 2, wherein the floor portions includes two abutting triangular shaped plates, each of the triangular shaped plates folding relative to each other along an abutment edge and folding up and down relative to a remaining portion of the floor along a respective lateral edge.

4. The grain tank of claim 3, wherein the triangular shaped plates are hinged together along the respective abutment edges.

5. The grain tank of claim 3, wherein the lateral edges join at an apex therebetween which is positioned adjacent to the front wall, and the rear wall includes four wall segments hinged together, with a middle two wall segments having a width extending between a respective said abutment edge and lateral edge when the floor is in the harvest position.

6. The grain tank of claim 5, wherein the middle two wall segments have a bottom edge which is angled to match and lie closely adjacent to the respective triangular shaped plate when the floor is in the harvest position.

7. The grain tank of claim 3, wherein each said side wall includes a vertically arranged hinge configured for accommodating expansion and contraction of the floor as the floor moves from the harvest position to the transport position.

8. The grain tank of claim 3, further including a pair of cross augers within said grain tank adjacent to the floor, on opposite sides of the triangular shaped plates, and configured for moving grain toward the at least one unloading conveyance.

9. The grain tank of claim 8, wherein each said cross auger lies generally parallel to a respective said lateral edge and is configured for moving grain toward a single said unloading conveyance at an apex between the lateral edges.

10. The grain tank of claim 1, wherein the walls include a pair of side walls, a front wall and a rear wall, and wherein the side walls are expanded laterally outward when in the harvest position.

11. The grain tank of claim 1, wherein the rear wall is expanded laterally outward when in the harvest position.

12. The grain tank of claim 11, wherein the rear wall does not expand rearward when in the harvest position.

13. The grain tank of claim 1, wherein the front wall does not expand laterally outward when in the harvest position.

14. The grain tank of claim 13, wherein the front wall is stationary and does not expand forward when in the harvest position.

15. An agricultural harvester, comprising:
a chassis; and
a grain tank carried by the chassis, said grain tank including:
an expandable and contractable floor comprising hinged floor portions and a plurality of side edges;
a plurality of upstanding walls, each said wall having a lower edge positioned along a corresponding side edge of the floor, at least one of the plurality of upstanding walls comprising a plurality of movable wall portions connected by hinges having axes extending at least in a vertical direction;
wherein lower edges of the wall portions are movable over the floor during adjustment from an expanded harvest position to a folded transport position; and
at least one unloading conveyance, each said unloading conveyance having an inlet in communication with an interior of the grain tank adjacent to the floor.

16. The grain tank of claim 15, wherein said walls include a pair of side walls, a front wall and a rear wall, and wherein the floor and the rear wall comprising the movable wall portions that are expandable and contractable in an accordion manner.

17. The grain tank of claim 16, wherein the hinged floor portions includes two abutting triangular shaped plates, each of the triangular shaped plates folding relative to each other along an abutment edge extending at least in a horizontal direction and folding relative to a remaining portion of the floor along a respective lateral edge.

18. The grain tank of claim 17, wherein the triangular shaped plates are hinged together along the respective abutment edges.

19. The grain tank of claim 17, wherein the lateral edges join at an apex therebetween which is positioned adjacent to the front wall, and the rear wall includes four wall segments hinged together, with a middle two wall segments having a width extending between a respective said abutment edge and lateral edge when the floor is in the harvest position.

* * * * *